(12) United States Patent  (10) Patent No.: US 8,131,013 B2
Ikeda et al.  (45) Date of Patent: Mar. 6, 2012

(54) METHOD AND DETECTING SYSTEM FOR POSITIONS OF FACIAL PARTS

(75) Inventors: Hiroshi Ikeda, Tokyo (JP); Keiichi Moriya, Tokyo (JP)

(73) Assignee: Kao Corporation, Tokyo (JP)

( * ) Notice: Subject to any disclaimer, the term of this patent is extended or adjusted under 35 U.S.C. 154(b) by 873 days.

(21) Appl. No.: 12/159,509

(22) PCT Filed: Dec. 26, 2006

(86) PCT No.: PCT/JP2006/325972
§ 371 (c)(1),
(2), (4) Date: Aug. 15, 2008

(87) PCT Pub. No.: WO2007/074844
PCT Pub. Date: Jul. 5, 2007

(65) Prior Publication Data
US 2010/0220925 A1   Sep. 2, 2010

(30) Foreign Application Priority Data

Dec. 28, 2005 (JP) .................................. 2005-380436
Apr. 17, 2006 (JP) .................................. 2006-113893

(51) Int. Cl.
*G06K 9/00* (2006.01)
(52) U.S. Cl. ........................................ 382/103; 382/173
(58) Field of Classification Search .................. 382/100, 382/103, 118, 173, 190; 348/77, 78
See application file for complete search history.

(56) References Cited

U.S. PATENT DOCUMENTS

| 6,072,892 A | 6/2000 | Kim .............................. 382/117 |
| 7,535,469 B2 | 5/2009 | Kim et al. .................... 345/419 |
| 2003/0146901 A1* | 8/2003 | Ryan ............................ 345/158 |

FOREIGN PATENT DOCUMENTS

| JP | 1 314385 A | 12/1989 |
| JP | 9-81756 | 3/1997 |

(Continued)

OTHER PUBLICATIONS

Decision of Refusal issued Jan. 12, 2011, in Japan Patent Application No. 2006-340420 (with English translation).

(Continued)

*Primary Examiner* — Andrew W Johns
(74) *Attorney, Agent, or Firm* — Oblon, Spivak, McClelland, Maier & Neustadt, L.L.P.

(57) ABSTRACT

A method and a system for simply and automatically detecting the positions of eyes, mouth, and nose in a face image with high reliability are provided. A plurality of grayscale images with gradually varying lightness are formed from a face image. Then, a process (fade-in process) is performed which detects pixel block areas that gradually appear in a face area in the grayscale images as the face area that is in a fade-out state at high lightness fades in and is brought into a fade-in state at low lightness. The detected pixel block areas include paired pixel block areas appearing as a pair. The positions of the eyes are determined based on the number of appearance of the paired pixel block areas over all the grayscale images. The positions of the mouth and nose are determined based on the positional relationship between the eyes and pixel block areas which are detected by the fade-in method and in which gradually appearing pixels no longer grow.

16 Claims, 12 Drawing Sheets

FOREIGN PATENT DOCUMENTS

| | | | |
|---|---|---|---|
| JP | 11-66317 | A | 3/1999 |
| JP | 2000 311248 | A | 11/2000 |
| JP | 2003-281539 | A | 10/2003 |
| JP | 2003-331316 | A | 11/2003 |
| JP | 2004 94917 | A | 3/2004 |

OTHER PUBLICATIONS

Chinese Office Action issued on Jan. 13, 2011, in Chinese Patent Application No. 200680053540.X (with English Translation).

Office Action issued on Jan. 13, 2011 in the corresponding China Application No. 200680053540.X (English Translation only).

Office Action issued Jun. 15, 2011, in Japanese Patent Application No. 2006-340420 with English translation.

Extended European Search Report issued Sep. 7, 2010 in PCT/JP2006325972.

M H Yang, et al., "Face Detection and Gesture Recognition for Human-Computer Interaction, Detecting Faces in Still Images", Kluwer International Series in Video Video Computing, XP-002597039, Jan. 1, 2001, pp. 23-26.

Shi-Hong Jeng, et al., "Facial Feature Detection Using Geometrical Face Model: An Efficient Approach", Pattern Recognition, vol. 31, No. 3, XP004101847, Mar. 1, 1998, pp. 273-282.

Chiunhsiun Lin, et al., "Human Face Detection Using Geometric Triangle Relationship", Pattern Recognition, 2000. Proceedings. 15th International Conference on Sep. 3-7, 2000. [Proceedings of the International Conference on Pattern Recognition. (ICPR)], vol. 2, XP010533968, Sep. 3, 2000, pp. 941-944.

Japanese Office Action mailed Sep. 29, 2010 in corresponding Japanese Application No. 2006-340420 (with English Translation).

Office Action issued Aug. 12, 2011, in Chinese Patent Application No. 200680053540.X with English translation.

* cited by examiner

METHOD AND DETECTING SYSTEM FOR POSITIONS OF FACIAL PARTS

TECHNICAL FIELD

The present invention relates to a method for automatically detecting the positions of facial parts such as eyes, a mouth, and a nose in a face image.

BACKGROUND ART

When color or other images are superimposed on facial parts, such as the eyes, mouth, and nose, of a face image of a subject or on the areas surrounding the facial parts to form a makeup simulation image, it is required to detect the positions of the facial parts, such as the eyes, mouth, and nose, of the face image.

In addition, when a hairstyle model image is superimposed on a face image of a subject to form a hairstyle simulation image, the positions of the eyes are detected to adjust the sizes of the images and to align the positions of the images. Moreover, the detection of the positions of the eyes is also performed, for example, to mask the eyes of a face image, to perform frame processing of a face image, and to produce an image for personal identification.

In an exemplary conventional method used for detecting the positions of the eyes in a face image, a skin-color region is extracted to detect the face, and then the eyes are detected using, for example, pattern matching (Non-Patent Document 1 and Patent Document 1).

[Non-Patent Document 1] "Method for detecting facial feature points that allows high-speed and high-reliability face detection," The winning paper of the 5-th LSI IP design award, 2005, Nikkei Business Publications, Inc.

[Patent Document 1] Japanese Patent Application Laid-Open No. 2004-94917.

DISCLOSURE OF THE INVENTION

Problems to be Solved by the Invention

However, extraction of a skin-color region is affected by illumination environment. Therefore, a reliability problem arises when a large number of face images taken in different illumination environments are processed. In addition, the pattern matching method has a problem that the computational cost is huge.

In view of the above, it is an object of the present invention to enable automatic detection of the positions of the eyes, mouth, and nose in a face image with high reliability by using a simple method.

Means for Solving the Problems

The present inventors have found the following:

When a plurality of grayscale images with gradually varying lightness are formed from a face image and then are observed in descending order of lightness from fade-out image side in high lightness side to fade-in image side, pixels first appearing in a fade-out face area are pixels in pupil areas;

In this case, the pixels in the pupil areas appear as a pair;

The eye positions can be determined based on the results of computation of the number of appearance of the paired pixel areas that is summed over all the grayscale images;

The method for determining the eye positions is applicable not only to still images but also to moving images;

In addition, the positions of the mouth and nose can be determined by selecting pixel blocks having a specific relationship with the eye positions from the pixel blocks obtained by observing the grayscale images successively from fade-out image side to fade-in image side, where the determination of the positions of the mouth and nose is made under additional conditions on the relative positions between the nose, mouth, and eyes.

Accordingly, the present invention provides a method for detecting positions of eyes, including:

producing a plurality of grayscale images with gradually varying lightness from a face image;

performing a process for detecting pixel block areas that gradually appear in a face area in the grayscale images as the face area that is in a fade-out state at high lightness fades in and is brought into a fade-in state at low lightness (hereinafter referred to as a fade-in process);

selecting, as a pair of candidate positions of the eyes, a pair of pixel block areas appearing as a pair from the detected pixel block areas; and determining the positions of the eyes based on frequency of appearance of each pair of the candidate positions of the eyes over all the grayscale images. In one embodiment of the above method, means for capturing the face image is a camera that takes a still image and a moving image.

The present invention also provides a method for detecting positions of facial parts, comprising:

performing a fade-in process on a face image to detect pixel block areas, selecting, as a pair of candidate positions of eyes, a pair of pixel block areas appearing as a pair from the detected pixel block areas, and determining the positions of the eyes based on frequency of appearance of each pair of the candidate positions of the eyes over all grayscale images;

selecting, from the detected pixel block areas detected by the fade-in process, a pixel block area in which gradually appearing pixels no longer grow, and grouping each selected pixel block area such that each pixel block area contained in the same group is located at the same vertical position;

forming a circumscribing rectangle for each grouped pixel block area;

selecting, from the circumscribing rectangles each formed for the each group, a circumscribing rectangle located in a predetermined area that is estimated from a relationship with the positions of the eyes, the selected circumscribing rectangle being used as a candidate position of a mouth; and selecting, from the selected circumscribing rectangles used as the candidate positions of the mouth, a circumscribing rectangle having the largest horizontal width, the selected circumscribing rectangle having the largest horizontal width being identified as the position of the mouth.

Moreover, the present invention provides a method for detecting positions of facial parts, including:

after the position of the mouth is determined using the above method, forming a circumscribing rectangle for the each selected pixel block area in which the gradually appearing pixels no longer grow, the each selected pixel block area having been selected from the detected pixel block areas detected by the fade-in process, and selecting, from the circumscribing rectangles each formed for the each selected pixel block area, a circumscribing rectangle located in a predetermined area that is estimated from a relationship with the positions of the eyes, the selected circumscribing rectangle being used as a candidate position of a nose; and selecting, from the selected circumscribing rectangles used as the candidate positions of the nose, a circumscribing rectangle having the largest horizontal width and having a lower side located above an upper side of the circumscribing rectangle identified as the position of the mouth, the selected circumscribing rectangle having the largest horizontal width being identified as the position of the nose.

Moreover, the present invention provides a system for detecting positions of eyes, including means for capturing a face image and computation means, wherein the computation means comprises:

a function for producing a plurality of grayscale images with gradually varying lightness from the face image;

a function for detecting pixel block areas that gradually appear in a face area in the grayscale images as the face area that is in a fade-out state at high lightness fades in and is brought into a fade-in state at low lightness;

a function for selecting, as a pair of candidate positions of the eyes, a pair of pixel block areas appearing as a pair from the detected pixel block areas; and a function for determining the positions of the eyes based on frequency of appearance of each pair of the candidate positions of the eyes over all the grayscale images. In one embodiment of the above system, the means for capturing the face image is a camera that takes a still image and a moving image.

Moreover, the present invention provides a system for detecting positions of facial parts, including means for capturing a face image and computation means, wherein the computation means comprises:

a function for producing a plurality of grayscale images with gradually varying lightness from the face image;

a function for detecting pixel block areas that gradually appear in a face area in the grayscale images as the face area that is in a fade-out state at high lightness fades in and is brought into a fade-in state at low lightness;

a function for selecting, as a pair of candidate positions of the eyes, a pair of pixel block areas appearing as a pair from the detected pixel block areas;

a function for determining the positions of the eyes based on frequency of appearance of each pair of the candidate positions of the eyes over all the grayscale images;

a function for selecting, from the detected pixel block areas, a pixel block area in which gradually appearing pixels no longer grow, and for grouping each selected pixel block area such that each pixel block area contained in the same group is located at the same vertical position;

a function for forming a circumscribing rectangle for each grouped pixel block area;

a function for selecting, from the circumscribing rectangles each formed for the each group, a circumscribing rectangle located in a predetermined area that is estimated from a relationship with the positions of the eyes, the selected circumscribing rectangle being used as a candidate position of a mouth;

a function for selecting, from the selected circumscribing rectangles used as the candidate positions of the mouth, a circumscribing rectangle having a largest horizontal width, the selected circumscribing rectangle having the largest horizontal width being identified as the position of the mouth;

a function for forming a circumscribing rectangle for the each selected pixel block area in which the gradually appearing pixels no longer grow, the each selected pixel block area having been selected from the detected pixel block areas;

a function for selecting, from the circumscribing rectangles each formed for the each selected pixel block area, a circumscribing rectangle located in a predetermined area that is estimated from a relationship with the positions of the eyes, the selected circumscribing rectangle being used as a candidate position of a nose; and a function for selecting, from the selected circumscribing rectangles used as the candidate positions of the nose, a circumscribing rectangle having a largest horizontal width and having a lower side located above an upper side of the circumscribing rectangle identified as the position of the mouth, the selected circumscribing rectangle having the largest horizontal width being identified as the position of the nose. In one embodiment of the above system, the means for capturing the face image is a camera that takes one of a still image and a moving image.

EFFECTS OF THE INVENTION

In the method or system for detecting the positions of eyes of the present invention, a plurality of grayscale images with gradually varying lightness are produced from a face image. Then, pixel block areas that gradually appear in a face area in the grayscale images as the face area that is in a fade-out state at high lightness fades in and is brought into a fade-in state at low lightness are detected as the candidate positions of the eyes. The positions of the eyes are determined based on the number of appearance of the candidate eye positions over all the grayscale images. Therefore, the positions of the eyes can be reliably detected irrespective of the illumination environment, the skin color and iris color of the subject, and the orientation of the face in the face image. In addition, since no pattern matching is required, the positions of the eyes can be detected using computational processing at high speed.

Simulation images are often formed by fitting a plurality of types of image information to a face image by using the positions of the eyes as the reference positions. For example, hairstyle simulation images are formed by fitting different hairstyle images to a face image using the positions of the eyes as the reference positions, and makeup simulation images are formed by fitting a partial makeup face image to a face image using the positions of the eyes as the reference positions. With the method or system of the present invention, the positions of the eyes can be detected with high positional detection accuracy, and therefore a naturally fitted simulation image can be formed. In addition, the method or system of the present invention can be preferably used for image processing for obscuring or filling a part of an image using the positions of the eyes as the reference positions. Examples of such image processing include image processing for masking an eye portion for protecting personal information. Since the above image processing can be performed at high speed, the image processing can be performed not only on still images but also on moving images.

In the method or system for detecting the positions of facial parts, as in the method or system for detecting the positions of eyes, first, pixel block areas obtained from a face image by the fade-in process are detected as candidate positions of the eyes, and the positions of the eyes are determined based on the number of appearance of the candidate positions of the eyes over all the grayscale images. Next, pixel block areas in which gradually appearing pixels no longer grow are selected from the pixel block areas detected by the fade-in process, and the selected pixel block areas are grouped. Then, a circumscribing rectangle is formed for each grouped pixel block area, and the position of the mouth is determined based on the horizontal width of each circumscribing rectangle and a positional relationship between the eyes and the circumscribing rectangle formed for the each group. Moreover, a circumscribing rectangle is also formed for each of the selected pixel block areas in which the gradually appearing pixels no longer grow and which have been selected from the pixel block areas detected by the fade-in process. The position of a nose is determined based on the horizontal width of the circumscribing rectangle formed for each of the selected pixel block areas, the positional relationship between the circumscribing rectangle and the eyes, and the positional relationship between the circumscribing rectangle and the mouth. Therefore, the positions of the eyes, mouth, and nose can be reliably detected irrespective of the illumination environment, the skin color and iris color of the subject, and the orientation of the face in the face image. In addition, since no pattern matching is required, the positions of the eyes, mouth, and nose can be detected using computational processing at high-speed.

Accordingly, when, for example, a makeup simulation image is formed by fitting, to a face image of a subject, makeup face images of facial parts such as the eyes, nose, and mouth and images of the areas surrounding the facial parts, a natural simulation image can be automatically and simply formed using a computational device.

Figure 1A:
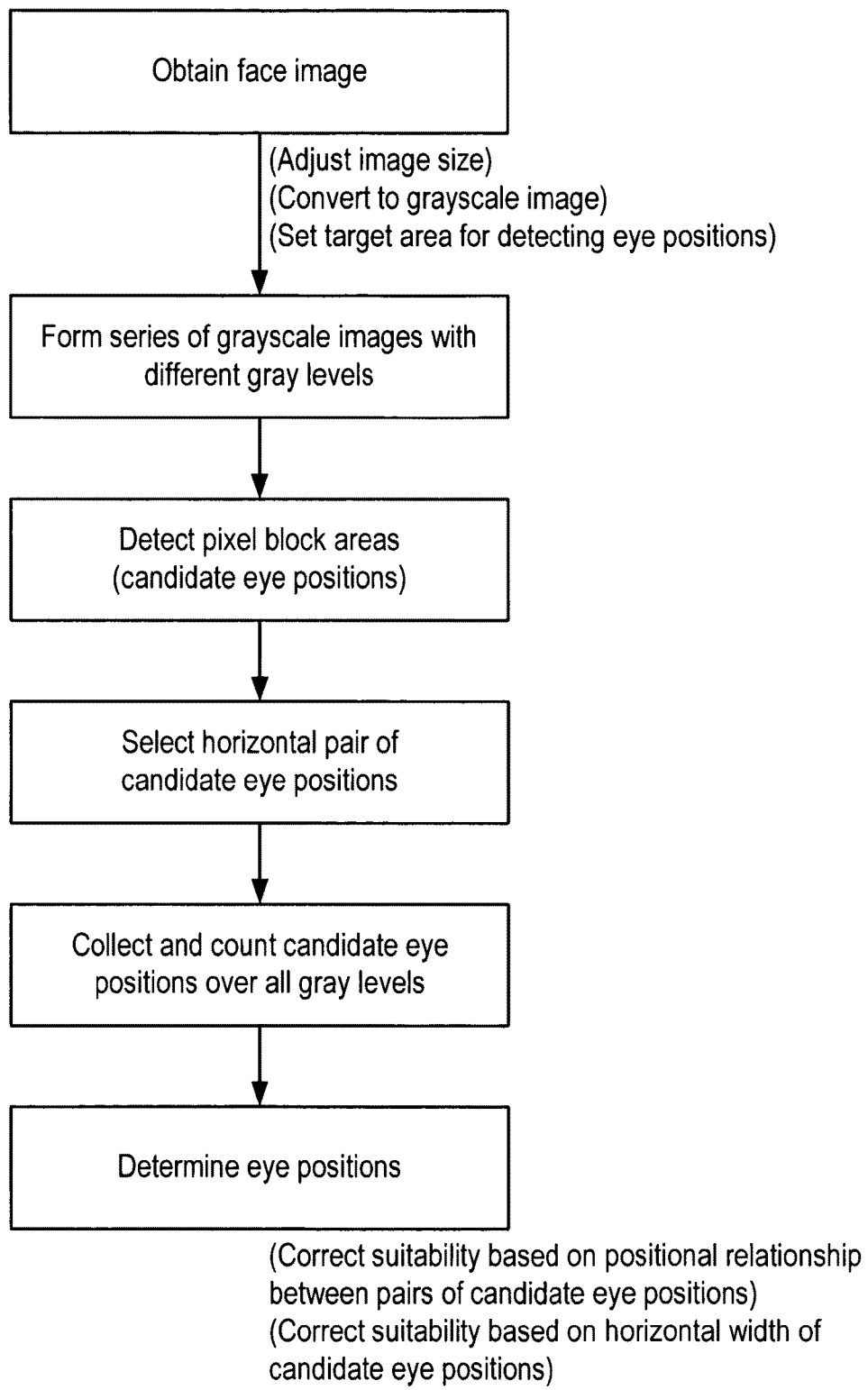
FIG. 1A is a flowchart showing a method for detecting the positions of eyes.

DESCRIPTION OF THE REFERENCE NUMERALS 1 image-capturing device
2 personal computer
3 display
4 image scanner
5 printer
10 eye position detecting system
20 grayscale face image
21 rectangular frame of target area for detecting eye positions
21' rectangular frame of target area for detecting mouth and nose positions
30 circumscribing rectangle that groups circumscribing rectangles of pixel block areas
31, 32, 33, 34 circumscribing rectangle of pixel block area
40, 41, 42 circle

BEST MODES FOR CARRYING OUT THE INVENTION

Hereinbelow, the present invention is described in detail with reference to the drawings.

Figure 1B:
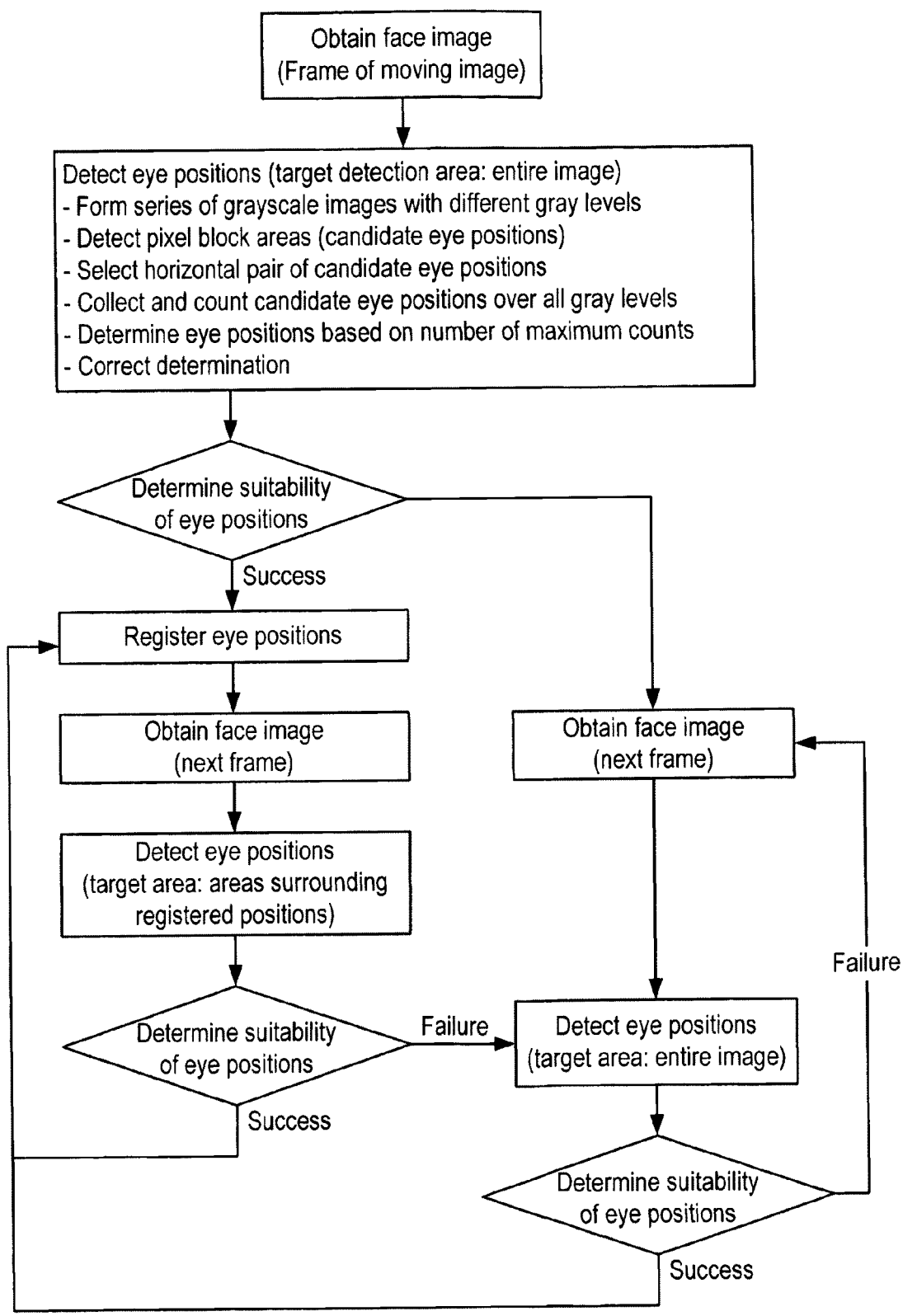
FIG. 1B is a flowchart showing a method for detecting the positions of eyes in a moving image.
Figure 1C:
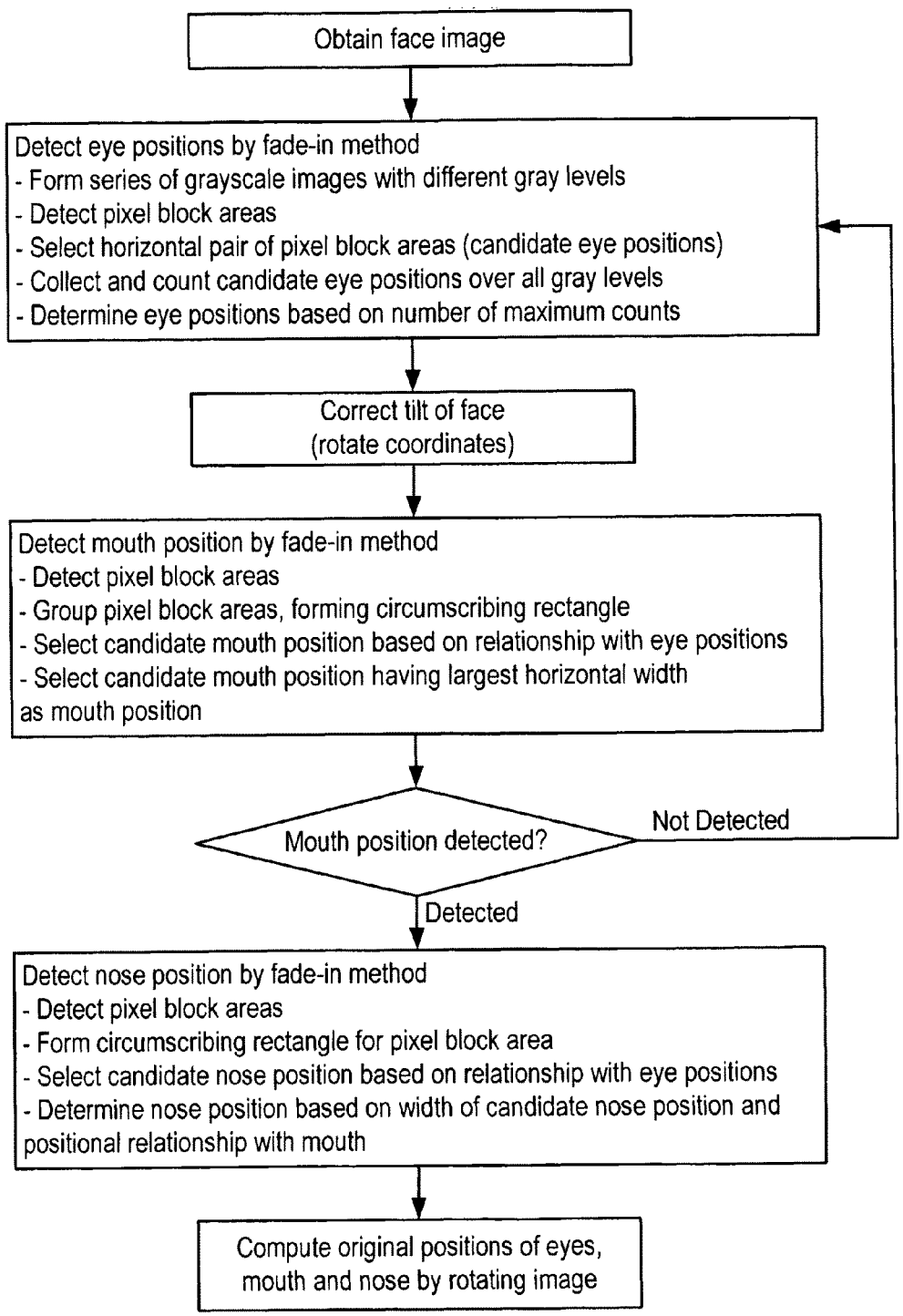
FIG. 1C is a flowchart showing a method for detecting the positions of facial parts.
Figure 2:
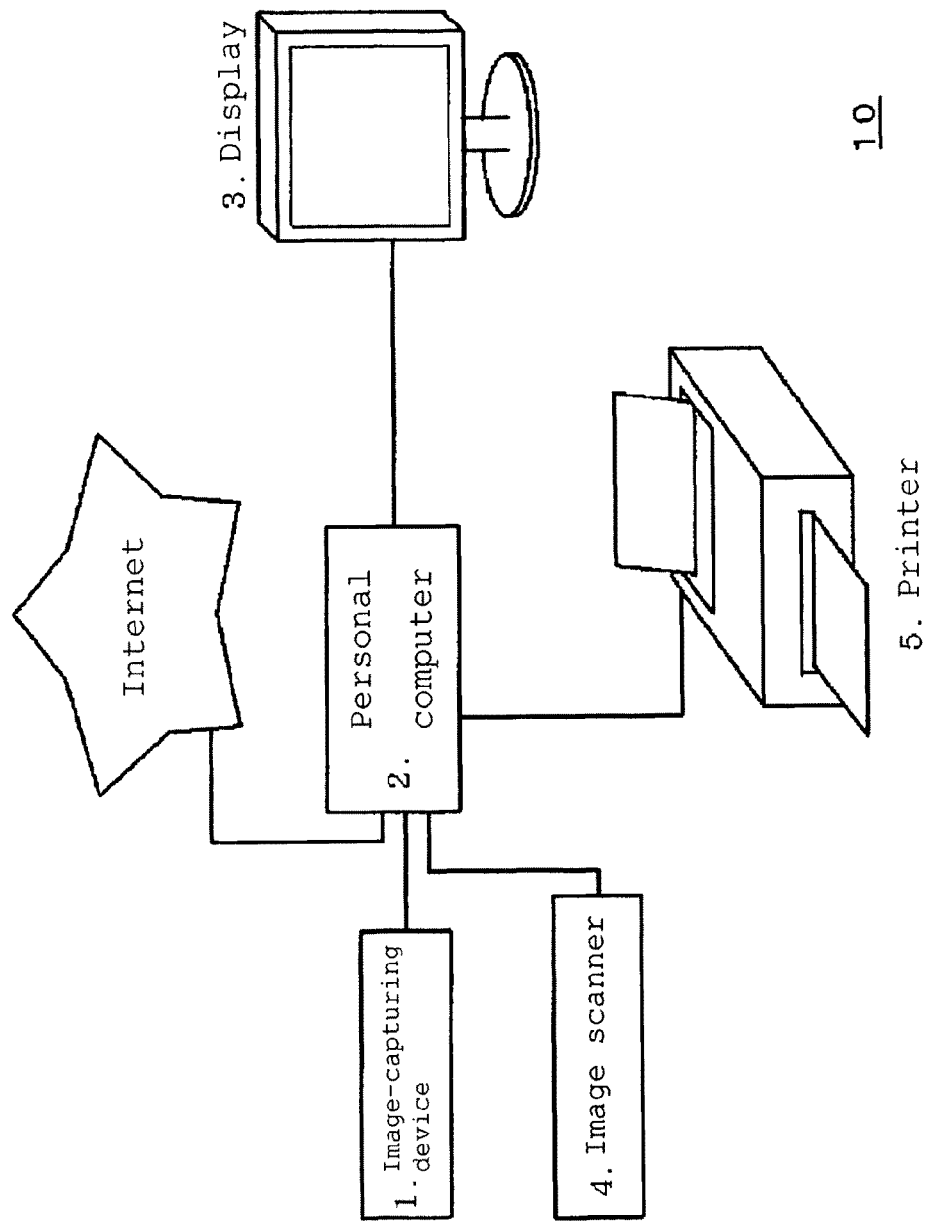
FIG. 2 is a block diagram of a system for detecting the positions of eyes.

FIG. 1A is a flowchart showing an embodiment of the eye position detecting method of the present invention; FIG. 1B is a flowchart showing another embodiment of the eye position detecting method of the present invention, the method being used for a moving image; FIG. 1C is a flowchart showing an embodiment of a method for successively detecting the positions of eyes, mouth, and nose; and FIG. 2 is a block diagram of a system for implementing these methods.

This system 10 is composed of an image-capturing device 1 and a personal computer 2. A display 3, an image scanner 4, a printer 5, and the like are connected to the personal computer 2.

The image-capturing device 1 is provided as means for capturing a face image of a subject, and a commercially available camera, such as a digital still camera, a digital video camera, or a web camera that can take a still or moving image can be used as the image-capturing device 1. When a moving image is used as a subject image for eye position detection, a video capture, if necessary, is connected between the image-capturing device 1 and the personal computer 2.

The personal computer 2 has an image processing function for producing a plurality of grayscale images with gradually varying lightness (for example, a series of 256-gray-level images in which each pixel value is changed by 2 or 3 levels). Examples of the method for producing the grayscale images include: (1) a method in which the average of the maximum and minimum values of the R, G, and B values is used for each pixel; (2) a method in which the average of the R, G, B values are used for each pixel; and (3) a method in which, after the R, G, and B values for each pixel are multiplied by respective predetermined weighing factors (such as NTSC), the resultant values are averaged. In the present invention, the method described in (3) is preferably used, and the gray levels are changed by 2 or 3 levels by using, for example, the following equation:

$$Y(\text{output brightness}) = 0.298912 \times R + 0.568811 \times G + 0.114478 \times B.$$

Such an image processing function for computing the grayscale can be obtained by installing commercial image processing software such as Photoshop (product of Adobe Systems Incorporated) on the personal computer 2.

In addition, the personal computer 2 includes: a function for changing contrast according to the change in lightness (for example, a function for reducing the contrast as the lightness is increased and for increasing the contrast as the lightness is reduced); a function for managing the series of the grayscale images numbered in ascending or descending order of lightness; a function for detecting pixel block areas that gradually appear in a face area in the series of the grayscale images as the face area that is in a fade-out state at high lightness fades in and is brought into a fade-in state at low lightness; a function for selecting, as a pair of candidate positions of the eyes, a pair of pixel block areas appearing as a pair from the detected pixel block areas; a function for counting the number of appearance of each pair of the candidate positions of the eyes over all the levels of the grayscale images and determining the positions of the eyes according to the number of appearance; and other functions.

Moreover, the personal computer 2 further includes: a function for adjusting the size of the face image; a function for setting a target area for detecting the positions of the eyes in the face image; a function for blurring the face image; a function for adjusting the vertical and horizontal sizes of a pixel block area to be detected within predetermined ranges in advance; a function for storing, as eye-position conditions for selecting specific eye positions from the candidate eye positions, positional relationships between the candidate eye positions, the widths of the candidate eye positions, and the like; a function for selecting eye positions satisfying the eye-position conditions from the candidate eye positions to determine the positions of the eyes; and other functions.

In addition, when a moving image is used as a target image for detecting the positions of the eyes, the personal computer 2 further includes: a function for selecting an appropriate frame from frames transmitted from the image-capturing device 1 at a predetermined frame rate; a function for storing the positions of the eyes in the selected frame if they are determined, the stored positions of the eyes and the areas surrounding the stored positions being used as a target area for detecting the eye positions in the next frame; and other functions.

When the positions of other facial parts in addition to the eyes are detected, the personal computer 2 further includes, in addition to the above functions, a function for determining the eye positions based on the number of appearance of each pair of the candidate eye positions over all the grayscale images. Moreover, the personal computer 2 further includes: a function for selecting, from the detected pixel block areas, a pixel block area in which gradually appearing pixels no longer grow, and grouping each selected pixel block area such that each pixel block area contained in the same group is located at the same vertical position; a function for forming a circumscribing rectangle for the each grouped pixel block area; a function for selecting a candidate mouth position having a specific positional relationship with the eyes from the circumscribing rectangles formed for the respective groups of the pixel block areas; and a function for selecting, as the mouth position, a circumscribing rectangle having the largest horizontal width from the circumscribing rectangles used as the candidate mouth positions. In addition, the personal computer 2 further includes: a function for forming a circumscribing rectangle for each of the detected pixel block areas; a function for selecting a candidate nose position having a specific positional relationship with the eyes from the circumscribing rectangles formed for the respective detected pixel block areas; a function for selecting, from the circumscribing rectangles used as the candidate nose positions, a circumscribing rectangle having the largest horizontal width and having the lower side located above the upper side of the circumscribing rectangle identified as the mouth position, the selected circumscribing rectangle being identified as the position of the nose; and other functions.

As shown in the flowchart of FIG. 1A, in the method for detecting the position of the eyes in a still image using the system 10, first, a face image used as a target image for detecting the positions of the eyes is captured and stored in the personal computer 2. For example, the face image may be obtained by taking a face image of a subject using the image-capturing device 1 and storing the face image in the personal computer 2, may be obtained by reading a facial photograph of the subject using the image scanner 4, or may be obtained through a communication line such as the Internet.

Next, if necessary, the number of pixels of the face image is adjusted such that the size of the face image is suitable for detecting the position of the eyes. More specifically, if the number of pixels of the face image is too large, the load of the detection processing becomes excessively large. If the number of pixels of the face image is too small, the accuracy for the eye position detection is reduced. Therefore, the image size is changed to about 480×360 to about 320×240.

When the face image is sharp, a large number of fine edges appear during subsequent image processing, and this causes noise that disturbs detection of the candidate eye positions. Therefore, if necessary, blurring processing is performed on the face image. In this case, the degree of blurring is preferably weak to medium. For example, the blurring processing is performed on each pixel such that the average brightness of 25 pixels, including a target pixel and pixels surrounding the target pixel, is outputted for the target pixel using a weighted blurring filter with a weighting factor to 1 to 5. The blurring processing may be performed a plurality of times in accordance with need.

Moreover, in the eye position detection method of the present invention, information about color is not required. Therefore, if the captured image is a color image, the color image is converted to a grayscale image in order to reduce the amount of subsequent processing.

Figure 3:
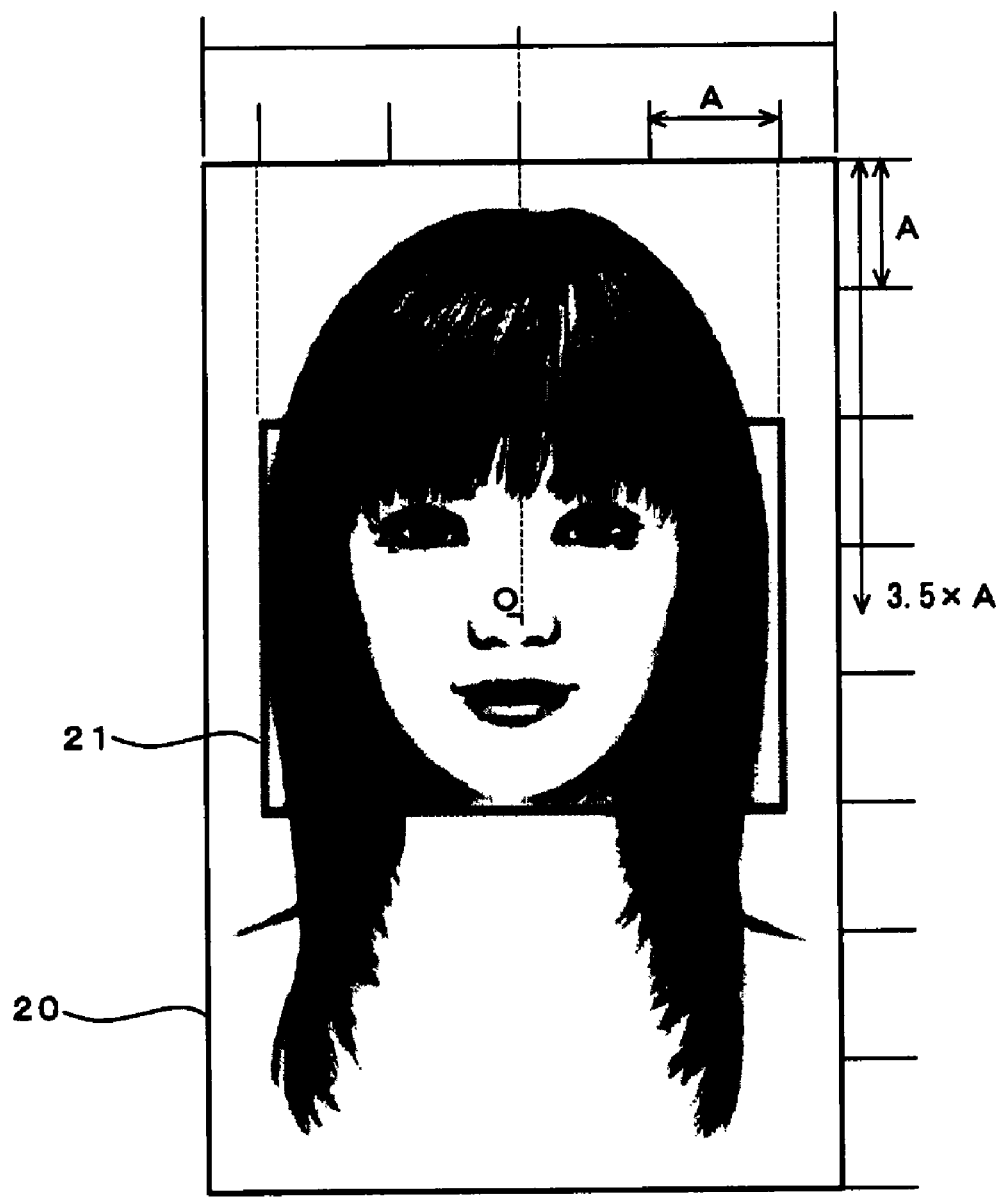
FIG. 3 describes a target area for detecting the positions of eyes.

Next, preferably, a target area for the eye position detection is pre-determined in the captured face image. For example, as shown in FIG. 3, a rectangular frame 21 used as the target area for the eye position detection is defined in a grayscale face image 20. The rectangular frame 21 can be defined using the following method. Let A be one-eighth of the length of the vertical side of the face image 20. Then, a region having a vertical length of 3 A and a horizontal length of 4 A is formed such that the center O of the region coincides with the center of coordinates of the face image 20. The center of coordinates of the face image 20 may be located on the widthwise center line of the face image 20 and 3.5 A from the upper side of the face image 20. The above method for defining the rectangle frame 21 as the target area for the eye position detection is applicable to any upper-body image.

Figure 4:
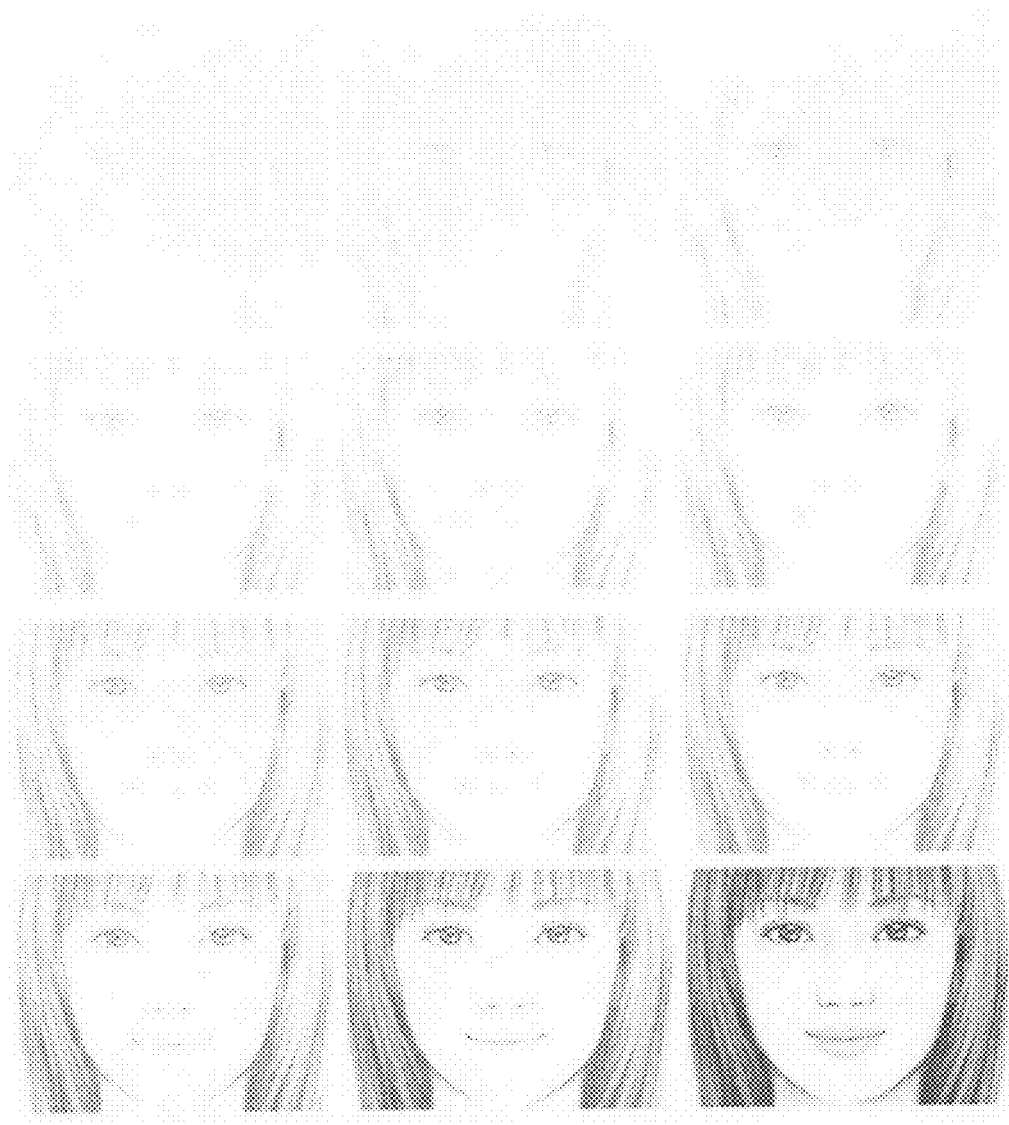
FIG. 4 is a series of grayscale images with gradually varying lightness.

Next, a plurality of grayscale images with gradually varying lightness as shown in FIG. 4 are formed. More specifically, for example, a completely fade-out image with a pixel value of 0 and a series of about 30 to about 100 fade-in images with gradually decreasing lightness are produced from a grayscale image with 256 gray levels. The eye portions are always found in any of the 30 to 100 images with different lightness levels. In this case, preferably, the contrast is reduced as the lightness is increased, and the contrast is increased as the lightness is reduced. In this manner, the eye portions appear in the fade-in images more clearly.

As can be seen from FIG. 4, generally, in the formed series of the grayscale images including the completely fade-out image with high lightness and the fade-in images with gradually decreasing lightness, pixel block areas of the pupils are first detected, and then pixel block areas of the nose and mouth are. Since the pixel block areas of the pupils appear as a left-right pair, the left-right pair of pixel block areas is selected for the pupils. At some gray levels, pairs of pixel block areas appear in areas around the mouth, eyebrows, forehead, and the like, in addition to the pupil area. However, in this stage, such pixel block areas are selected as the candidate eye positions detected.

Figure 5:
FIG. 5 is a series of tone-reversed images of the grayscale images with gradually varying lightness.

Preferably, when the pixel block areas are detected, the gray levels of the grayscale images with gradually varying lightness are reversed as shown in FIG. 5, in order to simplify the image processing.

Pixel block areas in a specific size range are detected as the candidate eye positions. As described above, one-eighth of the length of the vertical side of the grayscale face image 20 is defined as A. In this case, the specific size range for such pixel block areas is set such that the vertical length falls within the range of 0.4 A to 0.7 A and preferably 0.5 A to 0.7 A and the horizontal length falls within the range of 0.5 A to 1.0 A and preferably 0.7 A to 1.0 A. Pixel block areas located at the eye positions generally have the size within the above ranges. Therefore, by setting the size conditions described above, the amount of subsequent processing required for detecting the eye positions can be reduced.

Figure 6:
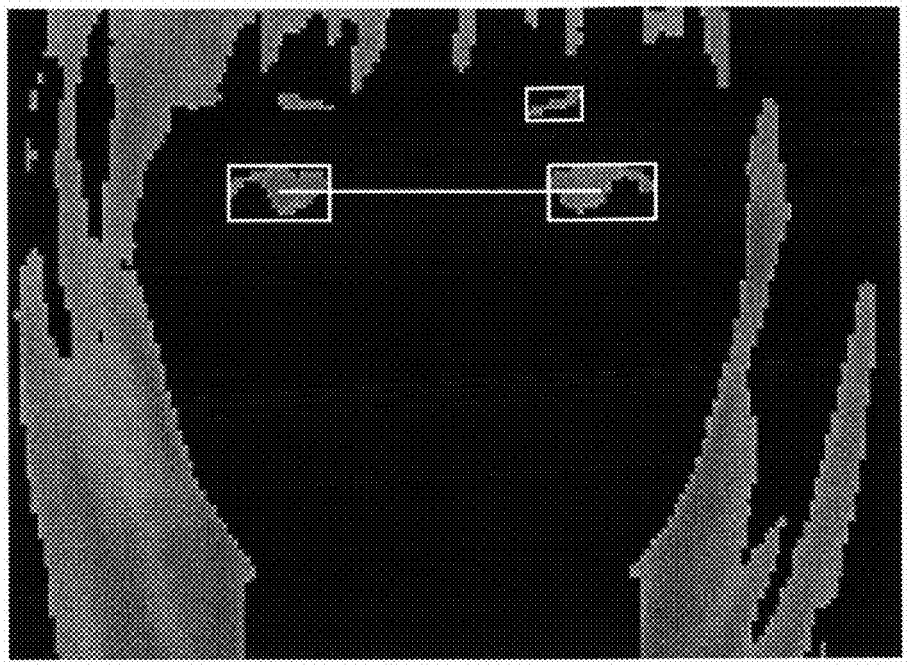
FIG. 6 describes pixel block areas in a fade-in image.

FIG. 6 shows a fade-in image at a certain gray level, and pixel block areas appearing in the face image are represented by rectangles. The pixel block areas forming a pair are connected by a straight line. In FIG. 6, the pixel block areas are surrounded by the circumscribing rectangles in order to clearly show the pair of the pixel block areas. However, when the eye positions are detected, it is not always necessary to surround the pixel block areas by the circumscribing rectangles.

Preferably, the following conditions (1) to (4) are set in advance for selecting candidate eye positions from pairs of pixel block areas:
(1) The horizontal distance between a left-right pair of pixel block areas falls within a predetermined range.
(2) The vertical distance between the left-right pair of pixel block areas falls within a predetermined range.
(3) The left pixel block area of the left-right pair of pixel block areas is located in the left-half region of the rectangular frame 21 of the face image.
(4) The right pixel block area of the left-right pair of pixel block areas is located in the right-half region of the rectangular frame 21 of the face image.

Figure 7:
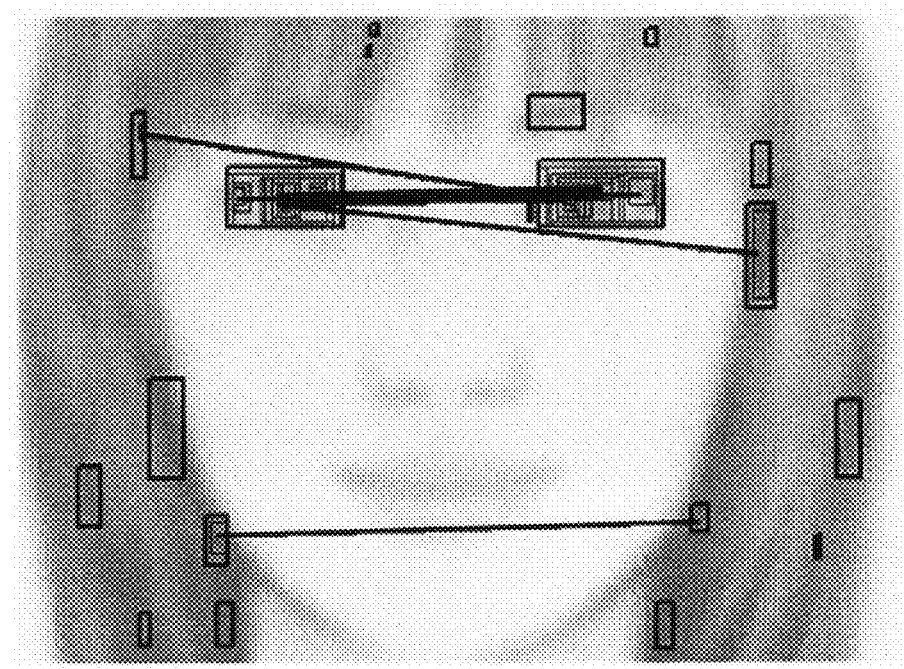
FIG. 7 describes a state in which candidate positions of the eyes are collected over all the gray-levels of the grayscale images.

Next, as shown in FIG. 7, pairs of the candidate eye positions appearing in fade-in images are collected over all the levels of the grayscale images, and the number of appearance of each of the pairs of candidate eye positions is counted. Then, a ranked list in descending order of the number of counts is produced. In this counting process, candidate eye positions in pupil areas that appear in the first place when the lightness is decreased stepwise from the lightness of the fade-out image and remain appearing at the final stage generally have the maximum number of counts (the first rank). Therefore, in principle, the candidate eye positions having the maximum number of counts are identified as the eye positions.

However, the candidate eye positions having the second largest number of counts are identified as the eye positions if all the following conditions (a) to (c) are satisfied or the following condition (d) is satisfied:
(a) The second ranked candidate eye positions are located above the first ranked candidate eye positions.
(b) The distance between the centers of the second ranked candidate eye positions is greater than that of the first ranked candidate eye positions.
(c) Areas corresponding to the left and right pupils of the second ranked candidate eye positions are both located outside the positions corresponding to the left and right pupils of the first ranked candidate eye positions.
(d) The vertical distance between the first ranked candidate eye positions and the second ranked candidate eye positions is of the order of the separation distance between the eyes and the eyebrows, and the first ranked candidate eye positions are located above the second ranked candidate eye positions.

In some rare cases, a mouth area is ranked first. The conditions (a) to (c) are provided for preventing the mouth position from being identified as the eye positions. The condition (d) is provided for preventing the positions of the eyebrows and the like located around the eyes from being identified as the eye positions.

Figure 8:
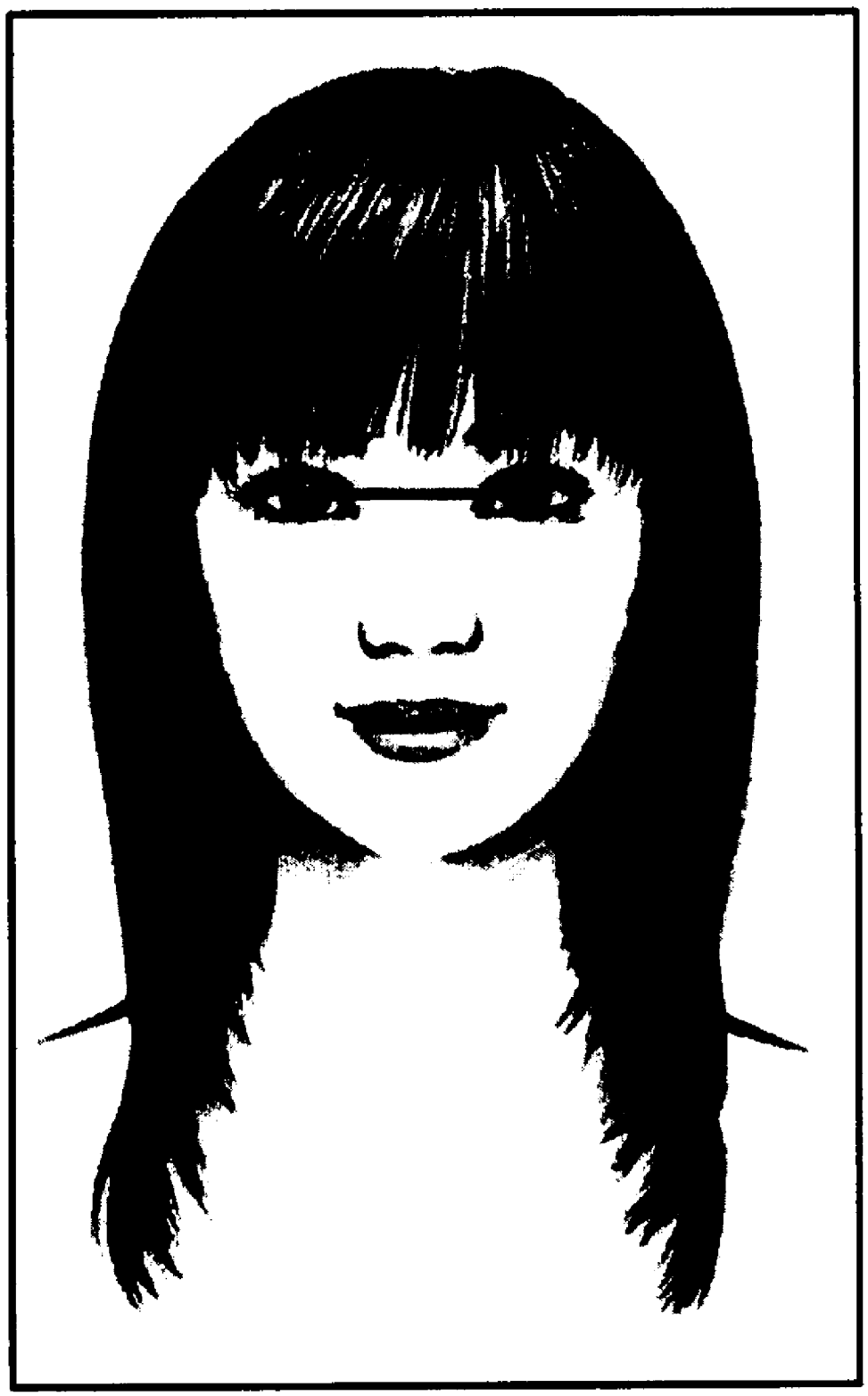
FIG. 8 is the original image in which the positions of the eyes are shown.

In the manner described above, the positions of the eyes (more correctly, the positions of the pupils) can be correctly detected in the face image (the original image before image processing), as shown in FIG. 8.

Meanwhile, in the method for detecting the eye positions in a moving image using the system 10, first, a frame of the moving image transferred from the image-capturing device 1 is obtained as a face image, and the eye positions in the face image are detected as shown in FIG. 1B. As in the case of the detection of the eye positions in a still image, the method for detecting the eye positions includes: forming a series of fade-in grayscale images with gradually varying lightness; detecting pixel block areas appearing in each fade-in image; selecting candidate eye positions (pixel block areas appearing as left-right pairs); collecting the pairs of candidate eye positions over all the gray levels of the grayscale images and counting the number of appearance of each of the pairs of candidate eye positions; determining the eye positions based on the maximum number of counts; and correcting the determined eye positions in a specific manner using the candidate eye positions and the distance between the centers of the eyes.

Preferably, in an initial frame transferred from the image-capturing device 1, the target area for detecting the eye positions is not restricted to a specific area, but the entire image is used as the target area.

Next, the suitability of the identified eye positions is determined. The determination is made using the following method. In the case where 100 fade-in images with different pixel values ranging from, for example, 0 to 255 are formed, the identified eye positions are not considered as the position of the eyes if the maximum number of counts is 5 or less. When this method is used for the determination of the suitability of the eye positions, the number of the fade-in images in the sequence and the maximum number of counts used for determining the suitability of the positions of the eyes are determined so as to be proportional to each other. Therefore, when a series of 200 fade-in images with different pixel values ranging from 0 to 255 are formed, the identified eye positions are not considered as the position of the eyes if the maximum number of counts is 10 or less.

When the identified eye positions are considered as the correct positions through the determination of the suitability of the position of the eyes, the identified eye positions are registered as the position of the eyes of the frame.

Then, a next frame transferred from the image-capturing device 1 (referred to as a frame N) is obtained, and the positions of the eyes are detected in a manner similar to that described above. In this case, only areas surrounding the registered positions of the eyes are used as the target area for detecting the eye position. If a determination is made that the eye positions are correctly detected also in the frame N, the detected positions are registered. In the next frame N+1, areas surrounding the eye positions registered in the pervious step are used as the target area for detecting the position of the eyes. By restricting the target area for detecting the positions of the eye, the processing speed can be increased.

When the eye positions are suitably detected, the areas surrounding the detected eye positions that are used as the target area for detecting the positions of the eyes for the next frame are defined as, for example, a rectangle having the center at the midpoint between the eyes, a horizontal length of 1.5 to 3 times, preferably 1.8 to 2.2 times, the distance between the centers of the eyes, and a vertical length of 0.5 to 2 times, preferably 0.8 to 1.2 times, the distance between the centers of the eyes.

If a determination is made that the identified eye positions detected in the initial frame is not suitable, the eye positions are no longer detected for this frame, and the eye positions are detected in the next frame.

If a determination is made that the identified eye positions detected in the frame N described above is not suitable, the eye positions are detected using the entire image of the frame N as the target area for the detection. If a determination is made that the eye positions detected in the entire image is suitable, the detected eye positions are registered. In the next frame N+1, the eye positions are detected using the areas surrounding the detected eye positions registered in the previous frame as the target area for the detection. However, if the eye positions are not detected in the frame N even when the entire image is used as the target area for the detection, the eye positions are no longer detected in the frame N, and the eye positions are detected in the next frame N+1.

The reasons why the eye positions are not suitably detected may be as follows: (i) The eyes are not present in the image; (ii) The eyes are present in the image but are closed; (iii) The images of the eyes are shaken because the positions of the eyes are moved at a fast rate.

In all the cases, if the eye positions are not suitably detected in a frame, the eye positions are detected in the next frame.

If the eye position detection does not catch up with the transmission of the frames (this depends on the size of the image and the frame rate), the eye position detection is performed for every predetermined number of frames.

For frames in which the eye positions have not been suitably detected and for frames in which the eye positions have not been detected because the eye position detection has been performed for every predetermined number of frames, the eye positions of other frame in which the eye positions are suitably detected may be used as the eye positions for the above frames. However, this depends on the content of the image or the purpose for detecting the eye positions. The frames in which the eye positions have not been detected may not be displayed on the display.

In the eye position detection method of the present invention, the eye positions can be accurately detected at high processing speed using a simple computational method irrespective of the skin color, iris color, and orientation of the face of the subject, and a change in illumination environment for the face image used as the target image for the eye position detection. Therefore, the eye positions can be detected from face images for all races including white and black.

The thus-detected eye positions can be used for various purposes that require the eye position detection. More specifically, the detected eye positions can be used for, for example, formation of hairstyle simulation images formed by fitting different hairstyle images to a face image using the eye positions as the reference positions, formation of makeup simulation images formed by fitting a partial makeup face image to a face image using the eye positions as the reference positions, masking processing of a face image, frame processing of a face image, and formation of images for personal identification.

Figure 9A:
FIG. 9A is a tilted face image.
Figure 9B:
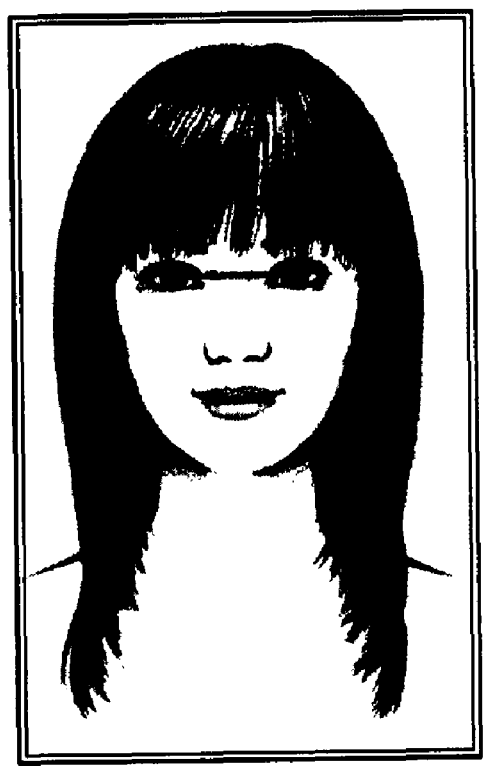
FIG. 9B is a tilt-corrected face image.

In the present invention, when the positions of the facial parts such as the mouth and nose, in addition to the positions of the eyes, are detected, the position of the mouth and then the position of the nose are detected using the method shown in the flowchart shown in FIG. 1C. Specifically, the positions of the mouth and nose are detected after the positions of the eyes are detected in a still or moving image using the method described above. In this case, if the face image is tilted as shown in FIG. 9A, it is preferable that the tilt of the face image be corrected before the detection of the mouth and nose positions by rotating the coordinates of the face image such that the straight line connecting the pupils of the eyes is horizontal as shown in FIG. 9B.

Figure 10:
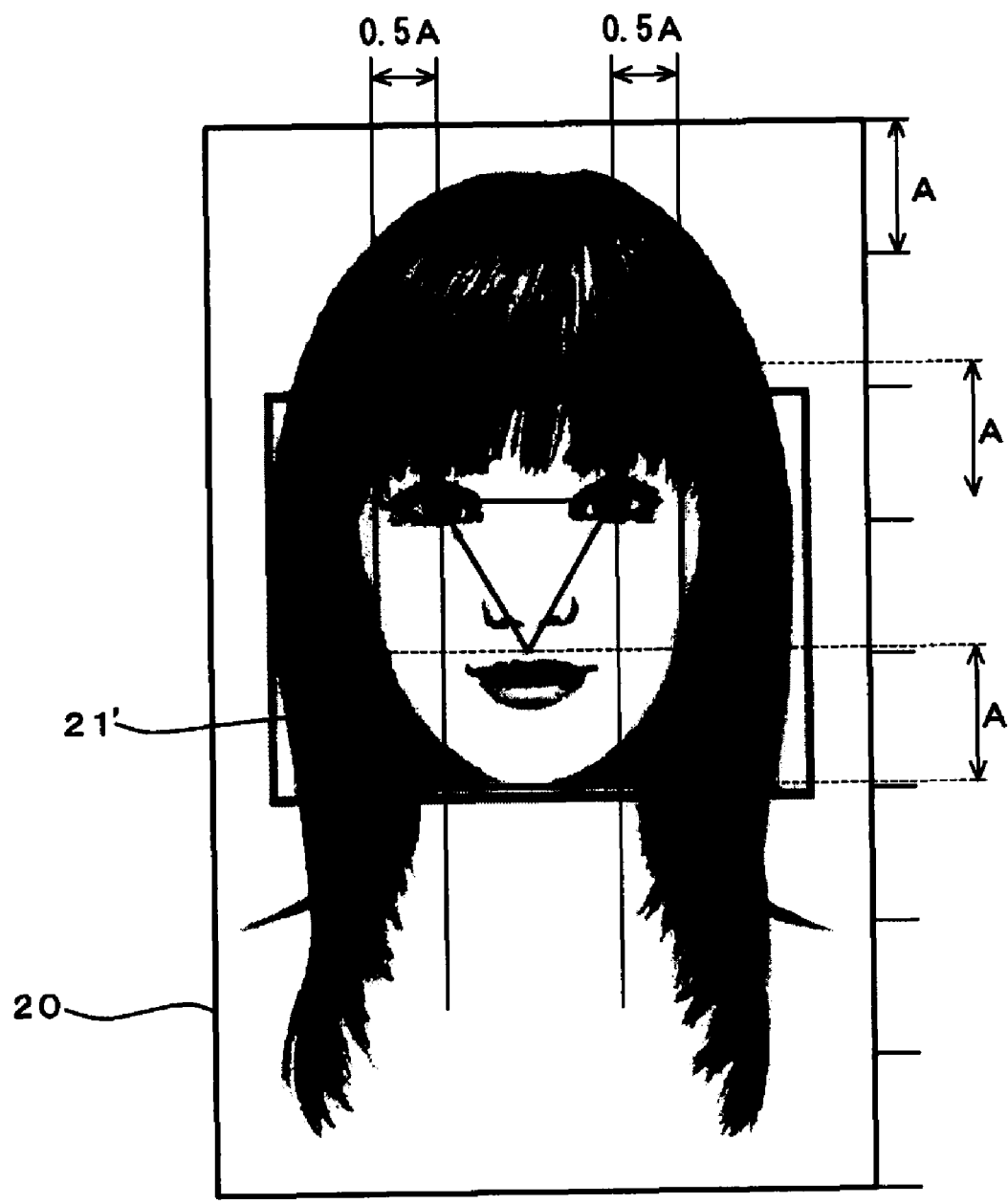
FIG. 10 describes target areas for detecting the positions of the mouth and nose.

Moreover, preferably, rectangular frames used for the target areas for detecting the mouse and nose are defined in the face image in advance. For example, let A be one-eighth of the vertical size of the face image 20. Then, as shown in FIG. 10, a rectangular frame 21' is defined that is drawn by expanding a rectangle circumscribing a reversed regular triangle having vertices located at the eye positions by a distance of A in the upward and downward directions and by a distance of 0.5 A in the left and right directions.

Figure 11:
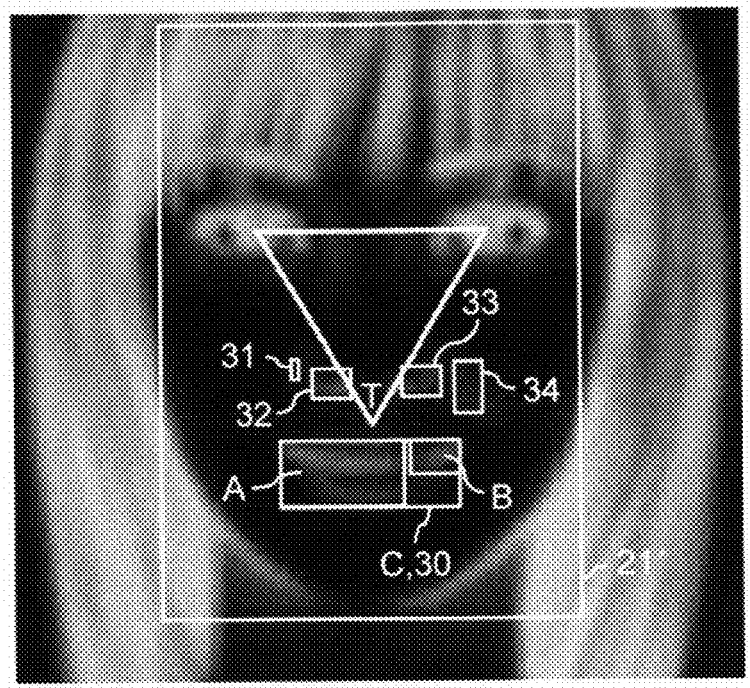
FIG. 11 describes rectangles circumscribing pixel block areas and grouping of the circumscribing rectangles.

When the mouth position is detected, the series of the grayscale images used for the detection of the eye positions is used. Preferably, within the defined rectangular frame 21', pixel block areas in which gradually appearing pixels no longer grow are selected from the detected pixel block areas, and the selected pixel block areas are grouped such that each pixel block area contained in the same group is located at the same vertical position. For example, as shown in FIG. 11, pixel block areas A and B are grouped into a group C.

When pixel block areas are grouped, the grouped area is set such that the maximum area thereof has a horizontal length not exceeding 1.1 times the distance between the pupils of the eyes and a vertical length not exceeding 0.6 times the distance between the pupils of the eyes. In this manner, unnecessary noise can be removed from the group of the pixel block areas for detecting the mouth position.

Figure 12:
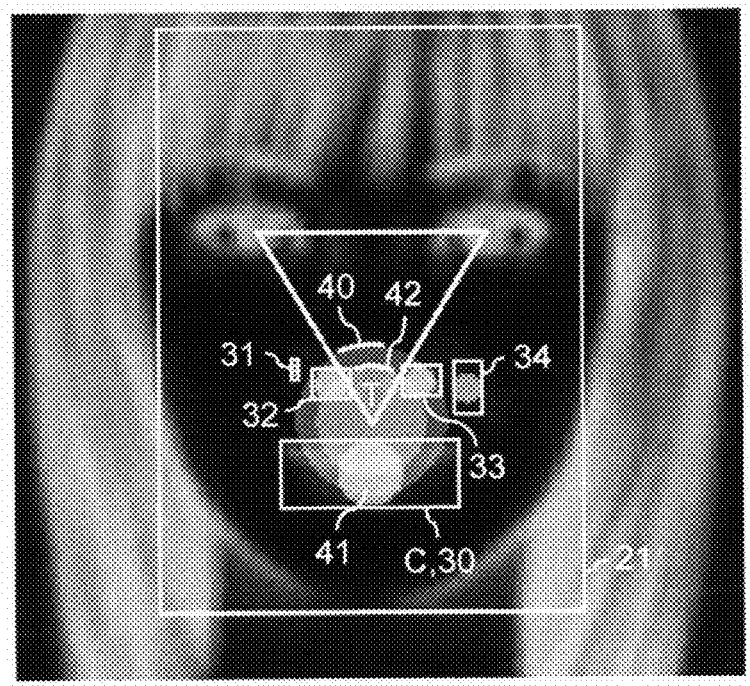
FIG. 12 describes a method for selecting circumscribing rectangles for the candidate positions of the mouth and nose.

A circumscribing rectangle is formed for each of the grouped pixel block areas. Then, a circumscribing rectangle having a specific relationship with the eye positions is selected from the circumscribing rectangles formed for each of the groups. More specifically, as shown in FIG. 12, a reverse regular triangle T having vertices located at the positions of the pupils of the eyes is drawn, and a circle 40 is drawn that has the center at the lower vertex of the reverse regular triangle T and a diameter of 0.65 to 1.0 times the side length of the reverse regular triangle T. In addition, a circle 41 is drawn that inscribes a circumscribing rectangle 30 of the group C and has the center at the center of the circumscribing rectangle 30. When the circle 41 overlaps the circle 40, the circumscribing rectangle 30 corresponding to the overlapping circle 41 is used as the candidate mouth position.

If a plurality of circumscribing rectangles are selected as the candidate mouth position, a circumscribing rectangle having the largest horizontal width is identified as the mouth position.

After the circumscribing rectangle 30 used as the mouth position is identified, the horizontal width of the identified circumscribing rectangle is used as the horizontal width of the pixels constituting the mouth.

If the horizontal width of the circumscribing rectangle selected as the mouth position does not intersect the bisector of the straight line segment connecting the pupils of the eyes (the line passing through the lower vertex of the reverse regular triangle), the circumscribing rectangle selected as the mouth position is expanded in the horizontal direction such that the expanded rectangle is symmetric in the horizontal direction with the center at the bisector. The mouth position is identified using the expanded rectangle.

If a circumscribing rectangle used as the mouth position is not found in the above processing, the mouth position detection is re-started by using as the eye positions the second candidate eye positions determined by the fade-in process (the second ranked eye positions in the rank of the number of counts).

After the mouth position is identified, the nose position is detected. The nose position is detected using the series of the grayscale images used for the eye position detection. Specifically, as preferably shown in FIG. 11, circumscribing rectangles 31, 32, 33, and 34 are formed within the defined rectangular frame 21' for each of the detected pixel block areas without grouping the detected pixel block areas. Subsequently, a circumscribing rectangle having a specific relationship with the eye positions is selected from the formed circumscribing rectangles 31, 32, 33, and 34. More specifically, as in the case of the mouth position detection, the reverse regular triangle T having vertices located at the positions of the eyes is drawn, and a circle 42 having the center at the lower vertex of the reverse regular triangle T and a diameter of 0.5 to 0.7 times the side length of the reverse regular triangle T is drawn as shown in FIG. 12. In addition, circles are drawn that inscribe the circumscribing rectangles 31, 32, 33, and 34 and have the centers at the centers of the circumscribing rectangles 31, 32, 33, and 34. If the drawn circles overlap the circle 42, the circumscribing rectangles 32 and 33 corresponding to the overlapping circles are used as the candidate nose position.

Next, a circumscribing rectangle having the largest horizontal width and having a lower side located above the upper side of the circumscribing rectangle 30 identified as the mouth position is selected from the circumscribing rectangles 32 and 33 used as the candidate nose positions and is identified as the nose position. More specifically, the position of the lower edge and the width of the nose are determined using the lower side of the circumscribing rectangle identified as the nose position.

If the horizontal width of the circumscribing rectangle identified as the nose position does not intersect the bisector of the straight line segment connecting the pupils of the eyes (the line passing through the lower vertex of the reverse regular triangle), the circumscribing rectangle selected as the nose position is expanded in the horizontal direction such that the expanded rectangle is symmetric in the horizontal direction with the center at the bisector. The position of the lower edge and the width of the nose are determined using the lower side of the expanded rectangle.

When the tilt of the tilted face image shown in FIG. 9A is corrected as shown in FIG. 9B in order to identify the nose and mouth positions, the coordinates are inversely rotated after the eye, nose, and mouth positions are determined, and the eye, nose, and mouth positions are converted to the positions in the original tilted face image.

INDUSTRIAL APPLICABILITY

The present invention is useful for various purposes in image processing of still and moving face images that require eye position detection. More specifically, the detected eye positions can be used for, for example, formation of hairstyle simulation images formed by fitting different hairstyle images to a face image using the eye positions as the reference positions, formation of makeup simulation images formed by fitting a partial makeup face image to a face image using the eye positions as the reference positions, masking processing of a face image, and frame processing of a face image.

Moreover, the present invention is useful for formation of makeup simulation images in which the eyes, mouth, and nose positions are required to be detected.

The invention claimed is:

1. A method for detecting positions of eyes, comprising:
producing a plurality of grayscale images with gradually varying lightness from a face image;
performing a process for detecting pixel block areas that gradually appear in a face area in the grayscale images as the face area that is in a fade-out state at high lightness fades in and is brought into a fade-in state at low lightness (hereinafter referred to as a fade-in process);
selecting, as a pair of candidate positions of the eyes, a pair of pixel block areas appearing as a pair from the detected pixel block areas; and
determining the positions of the eyes based on frequency of appearance of each pair of the candidate positions of the eyes over all the grayscale images.

2. The method for detecting positions of eyes according to claim 1, wherein the positions of the eyes are determined based on a positional relationship between the pairs of candidate positions of the eyes or on horizontal widths of the pairs of candidate positions of the eyes.

3. The method for detecting positions of eyes according to claim 1 or 2, wherein gray-levels of the grayscale images are reversed so that the pixel block areas are detected.

4. The method for detecting positions of eyes according to claim 3, wherein the face image is a still image or a frame of a moving image.

5. The method for detecting positions of eyes according to claim 4, wherein, when the positions of the eyes are determined in a single frame of the moving image, areas surrounding the determined positions of the eyes are used as a target area for detecting the positions of the eyes in a frame subsequent to the single frame.

6. A method for detecting positions of facial parts, comprising:
performing a fade-in process on a face image to detect pixel block areas, selecting, as a pair of candidate positions of eyes, a pair of pixel block areas appearing as a pair from the detected pixel block areas, and determining the positions of the eyes based on frequency of appearance of each pair of the candidate positions of the eyes over all grayscale images;
selecting, from the detected pixel block areas detected by the fade-in process, a pixel block area in which gradually appearing pixels no longer grow, and grouping each selected pixel block area such that each pixel block area contained in the same group is located at the same vertical position;
forming a circumscribing rectangle for each grouped pixel block area;
selecting, from the circumscribing rectangles each formed for the each group, a circumscribing rectangle located in a predetermined area that is estimated from a relationship with the positions of the eyes, the selected circumscribing rectangle being used as a candidate position of a mouth; and
selecting, from the selected circumscribing rectangles used as the candidate positions of the mouth, a circumscribing rectangle having a largest horizontal width, the selected circumscribing rectangle having the largest horizontal width being identified as the position of the mouth.

7. The method for detecting positions of facial parts according to claim 6, wherein:
a reverse regular triangle having left and right vertices located at positions of pupils of the eyes is drawn; a circle is drawn that has a center at a lower vertex of the reverse regular triangle and a diameter of 0.65 to 1.0 times a side length of the reverse regular triangle; and a circumscribing rectangle including an inscribing circle at a center thereof that overlaps the circle is used as the candidate position of the mouth.

8. The method for detecting positions of facial parts according to claim 6 or 7, wherein the face image is a still image or a frame of a moving image.

9. The method for detecting positions of facial parts according to claim 8, wherein, when the positions of the eyes are determined in a single frame of the moving image, areas surrounding the determined positions of the eyes are used as a target area for detecting the positions of the eyes in a frame subsequent to the single frame.

10. The method for detecting positions of facial parts according to claim 6, further comprising:
    after the position of the mouth is determined forming a circumscribing rectangle for each selected pixel block area in which the gradually appearing pixels no longer grow, the each selected pixel block area having been selected from the detected pixel block areas detected by the fade-in process;
    selecting, from the circumscribing rectangles each formed for the each selected pixel block area, a circumscribing rectangle located in a predetermined area that is estimated from a relationship with the positions of the eyes, the selected circumscribing rectangle being used as a candidate position of a nose; and
    selecting, from the selected circumscribing rectangles used as the candidate positions of the nose, a circumscribing rectangle having a largest horizontal width and having a lower side located above an upper side of the circumscribing rectangle identified as the position of the mouth, the selected circumscribing rectangle having the largest horizontal width being identified as the position of the nose.

11. The method for detecting positions of facial parts according to claim 10, wherein:
    a reverse regular triangle having left and right vertices located at positions of pupils of the eyes is drawn; a circle is drawn that has a center at a lower vertex of the reverse regular triangle and a diameter of 0.5 to 0.7 times a side length of the reverse regular triangle; and a circumscribing rectangle including an inscribing circle at a center thereof that overlaps the circle is selected from the circumscribing rectangles each formed for the each selected pixel block area and is used as the candidate position of the mouth.

12. A system for detecting positions of eyes, comprising means for capturing a face image and computation means, wherein
    the computation means comprises:
    a function for producing a plurality of grayscale images with gradually varying lightness from the face image;
    a function for detecting pixel block areas that gradually appear in a face area in the grayscale images as the face area that is in a fade-out state at high lightness fades in and is brought into a fade-in state at low lightness;
    a function for selecting, as a pair of candidate positions of the eyes, a pair of pixel block areas appearing as a pair from the detected pixel block areas; and
    a function for determining the positions of the eyes based on frequency of appearance of each pair of the candidate positions of the eyes over all the grayscale images.

13. The system for detecting positions of eyes according to claim 12, the computation means further comprising a function for determining the positions of the eyes based on a positional relationship between the pairs of candidate positions of the eyes or on horizontal widths of the pairs of candidate positions of the eyes.

14. The system for detecting positions of eyes according to claim 12 or 13, wherein the means for capturing the face image is a camera that takes one of a still image and a moving image.

15. A system for detecting positions of facial parts, comprising means for capturing a face image and computation means, wherein
    the computation means comprises:
    a function for producing a plurality of grayscale images with gradually varying lightness from the face image;
    a function for detecting pixel block areas that gradually appear in a face area in the grayscale images as the face area that is in a fade-out state at high lightness fades in and is brought into a fade-in state at low lightness;
    a function for selecting, as a pair of candidate positions of the eyes, a pair of pixel block areas appearing as a pair from the detected pixel block areas;
    a function for determining the positions of the eyes based on frequency of appearance of each pair of the candidate positions of the eyes over all the grayscale images;
    a function for selecting, from the detected pixel block areas, a pixel block area in which gradually appearing pixels no longer grow, and for grouping each selected pixel block area such that each pixel block area contained in the same group is located at the same vertical position;
    a function for forming a circumscribing rectangle for each grouped pixel block area;
    a function for selecting, from the circumscribing rectangles each formed for the each group, a circumscribing rectangle located in a predetermined area that is estimated from a relationship with the positions of the eyes, the selected circumscribing rectangle being used as a candidate position of a mouth;
    a function for selecting, from the selected circumscribing rectangles used as the candidate positions of the mouth, a circumscribing rectangle having a largest horizontal width, the selected circumscribing rectangle having the largest horizontal width being identified as the position of the mouth;
    a function for forming a circumscribing rectangle for the each selected pixel block area in which the gradually appearing pixels no longer grow, the each selected pixel block area having been selected from the detected pixel block areas;
    a function for selecting, from the circumscribing rectangles each formed for the each selected pixel block area, a circumscribing rectangle located in a predetermined area that is estimated from a relationship with the positions of the eyes, the selected circumscribing rectangle being used as a candidate position of a nose; and
    a function for selecting, from the selected circumscribing rectangles used as the candidate positions of the nose, a circumscribing rectangle having a largest horizontal width and having a lower side located above an upper side of the circumscribing rectangle identified as the position of the mouth, the selected circumscribing rectangle having the largest horizontal width being identified as the position of the nose.

16. The system for detecting positions of facial parts according to claim 15, wherein the means for capturing the face image is a camera that takes one of a still image and a moving image.

* * * * *